United States Patent
Youngers et al.

(10) Patent No.: US 7,944,592 B2
(45) Date of Patent: May 17, 2011

(54) IMAGE CAPTURE DEVICE

(75) Inventors: Kevin Youngers, Vancouver, WA (US); Ted A. Smith, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 533 days.

(21) Appl. No.: 11/612,135

(22) Filed: Dec. 18, 2006

(65) Prior Publication Data

US 2008/0144137 A1 Jun. 19, 2008

(51) Int. Cl.
*H04N 1/46* (2006.01)

(52) U.S. Cl. ......... 358/504; 358/1.9; 358/505; 358/514; 358/516; 358/517; 358/518; 358/521; 358/529; 382/162; 382/167; 382/254

(58) Field of Classification Search ............ 358/1.9, 358/504, 505
See application file for complete search history.

(56) References Cited

U.S. PATENT DOCUMENTS

| | | | |
|---|---|---|---|
| 5,271,096 A * | 12/1993 | Cook | 345/604 |
| 5,363,318 A * | 11/1994 | McCauley | 702/85 |
| 5,488,464 A | 1/1996 | Wenthe, Jr. et al. | |
| 5,818,976 A | 10/1998 | Pasco et al. | |
| 5,850,472 A * | 12/1998 | Alston et al. | 382/162 |
| 6,005,683 A * | 12/1999 | Son et al. | 358/488 |
| 6,166,394 A | 12/2000 | Rubscha | |
| 6,226,419 B1 * | 5/2001 | Lodwick et al. | 382/294 |
| 6,263,122 B1 | 7/2001 | Simske et al. | |
| 6,654,493 B1 * | 11/2003 | Hilliard et al. | 382/167 |
| 6,744,536 B2 | 6/2004 | Buchar et al. | |
| 7,072,527 B1 | 7/2006 | Nako | |
| 7,414,750 B2 * | 8/2008 | Yoshida | 358/1.9 |
| 2002/0093692 A1 * | 7/2002 | Spencer | 358/449 |
| 2002/0122213 A1 * | 9/2002 | Hill et al. | 358/474 |
| 2003/0099002 A1 | 5/2003 | Yeh et al. | |
| 2004/0212853 A1 * | 10/2004 | Kelly et al. | 358/488 |
| 2005/0029352 A1 * | 2/2005 | Spears | 235/454 |
| 2005/0243382 A1 | 11/2005 | Wang | |
| 2006/0001917 A1 | 1/2006 | Chen | |
| 2006/0001921 A1 * | 1/2006 | Bailey et al. | 358/504 |
| 2006/0023218 A1 * | 2/2006 | Jung et al. | 356/419 |
| 2006/0077405 A1 * | 4/2006 | Topfer et al. | 358/1.9 |
| 2006/0215230 A1 * | 9/2006 | Borrey et al. | 358/448 |

* cited by examiner

*Primary Examiner* — Twyler L Haskins
*Assistant Examiner* — Miya J Cato

(57) ABSTRACT

Embodiments of a method performed by an image capture device are provided. The method includes performing a calibration operation on a photosensor array of the image capture device using a background surface with a substantially uniform grey color and performing a scan operation to capture a scanned image from a medium using the background surface.

18 Claims, 2 Drawing Sheets

IMAGE CAPTURE DEVICE

BACKGROUND

Optical scanners operate by detecting light from a medium, such as a sheet of paper, using a photosensor and deriving a digital image from the detected light. The light may be provided by an illumination source within the scanner. To allow the scanner to properly translate the detected light into a digital image, scanners typically calibrate the photosensor using a background with a relatively light color. A relatively light color background may provide the maximum amount of light to the photosensor in the calibration process.

In the process of scanning from medium, however, a relatively light color background may make it difficult for the scanner to detect the edges of a medium being scanned. In addition, a relatively light color background may also cause light to be reflected off of the background and through the medium to result in undesirable "bleed through" of the medium. To avoid these problems, scanners may use a relatively dark background during the process of scanning from medium.

The use of different backgrounds in the calibration and scan operations of scanner may result in added complexity in the scanner and higher costs.

DETAILED DESCRIPTION

In the following detailed description, reference is made to the accompanying drawings, which form a part hereof, and in which is shown by way of illustration specific embodiments in which the disclosed subject matter may be practiced. It is to be understood that other embodiments may be utilized and structural or logical changes may be made without departing from the scope of the present disclosure. The following detailed description, therefore, is not to be taken in a limiting sense, and the scope of the present disclosure is defined by the appended claims.

As described herein, an embodiment of an image capture device is provided. The image capture device is configured to scan images from a medium and store digital images in a memory using a photosensor array during a scan operation. The image capture device uses the same background surface to perform the scan operation as it does to perform a calibration operation of the photosensor array. The background surface may be any suitable non-white and non-black color such as grey.

Figure 1:
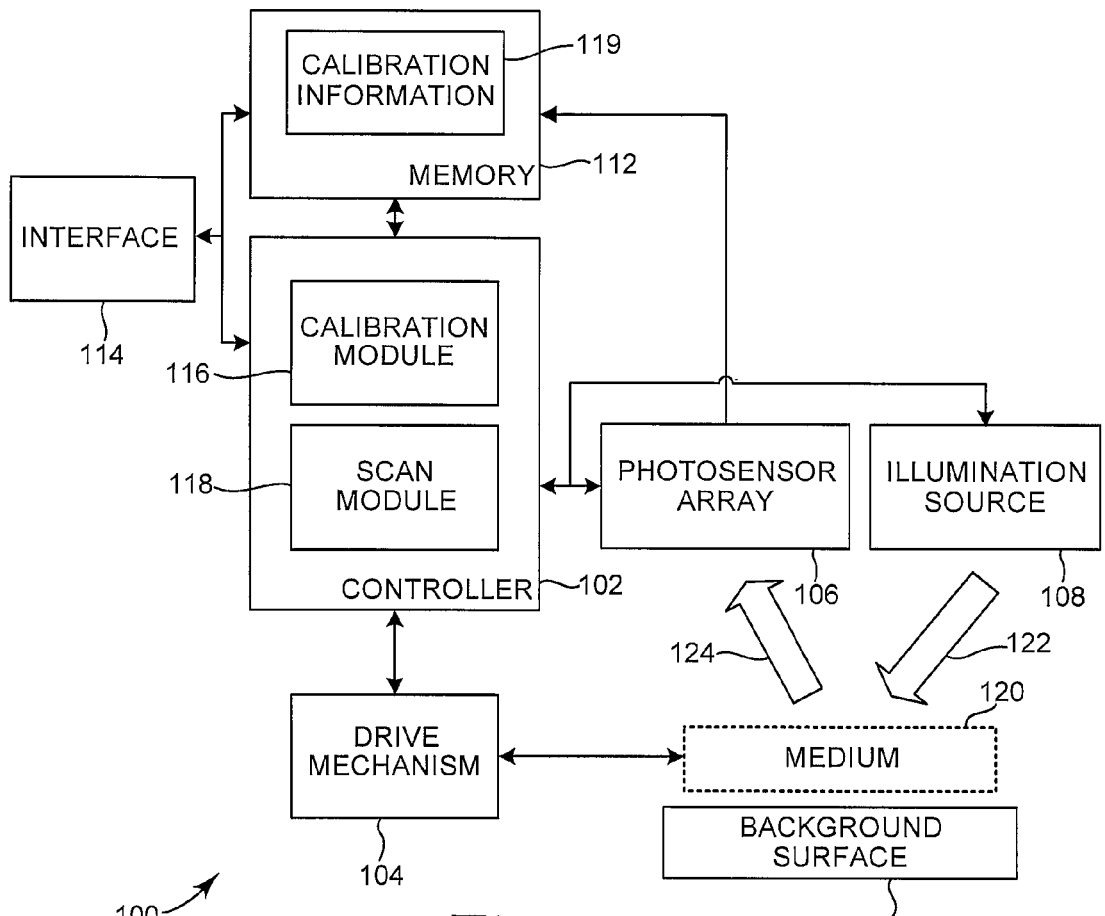
FIG. 1 is a block diagram illustrating one embodiment of an image capture device.

FIG. 1 is a block diagram illustrating one embodiment of an image capture device 100. Image capture device 100 includes a controller 102, a drive mechanism 104, a photosensor array 106, an illumination source 108, a background surface 110, a memory 112, and an interface 114. Controller 102 includes a calibration module 116 and a scan module 118, and memory 112 stores calibration information 119.

Image capture device 100 forms a scanner configured to scan images from a medium 120 and store digital images in memory 112. Image capture device 100 provides the digital images to an external device (not shown) coupled, directly or indirectly, to interface 114.

Controller 102 controls and manages the operation of image capture device 100 in response to signals received from an input/output device (not shown) and/or an external device (not shown) coupled, directly or indirectly, to interface 114. The input/output device may include any combination of buttons, keys, dials, switches, touch-pads, and visual displays, for example. The external device may be a computer system, a print server, or a network device, for example. Controller 102 processes the received signals and provides control signals to drive mechanism 104, photosensor array 106, illumination source 108, memory 112, and interface 114 to control and manage the operation image capture device 100.

Drive mechanism 104 is configured to adjust the position of medium 120 relative to photosensor array 106 and background surface 110. In one embodiment, drive mechanism 104 is configured as a sheet-feed mechanism to receive medium 120 and feed medium 120 between photosensor array 106 and background surface 110 during a scan operation. Photosensor array 106 is fixed with reference to a housing (not shown) of image capture device 100 in this embodiment. Drive mechanism 104 may receive medium 120 individually or may be configured to store a set of media 120 (e.g., a number of sheets of paper) prior to moving individual mediums relative to photosensor array 106 and background surface 110.

Photosensor array 106 includes any suitable type, number, and arrangement of photosensor cells or devices (not shown). For example, photosensor array 106 may include a charge coupled device (CCD) or a contact image sensor (CIS). The photosensor cells or devices of photosensor array 106 may be arranged in one or more rows. Photosensor array 106 activates to measure a received intensity of light during an exposure period in response to control signals from controller 102. Photosensor array 106 may also include any suitable combination of reflective elements (e.g., mirrors) and refractive elements (e.g., lenses) for directing and focusing light from background surface 110 and/or medium 120 onto the photosensor cells or devices.

Illumination source 108 includes any suitable type of light source configured to provide light to illuminate background surface 110 and/or medium 120 during scanning and calibration operations. Illumination source 108 activates to provide the light in response to control signals from controller 102.

Background surface 110 forms a unitary planar or non-planar surface with a uniform color that is positioned relative to photosensor array 106. Background surface 110 may be mounted in any suitable fixed or varying relationship to photosensor array 106. Background surface 110 has a color that is light enough to allow photosensor array 106 to be calibrated (i.e., light enough to allow differences between an image captured to include background surface 110 and the known color of background surface 110 to be detected) and is dark enough to allow one or more edges of medium 120 to be detected and identified during a scan operation. Background surface 110 is used in both a calibration operation and a scan operation, as described in additional detail below, and forms both the target area of a scan operation and the calibration area of a calibration operation. The color of background surface 110 may be any color between, but not including, white and black (e.g., grey). The color of background surface 110 may include any combination of red, blue, and green values that combine to produce a non-white and non-black color. In one embodiment, the color of background surface 110 includes approximately 50% red, approximately 50% blue, and approximately 50% green values to form a color that is approximately 50% grey. In other embodiments, the color of background surface 110 may be another non-white and non-black shade of grey or shade of other another color.

Memory 112 includes any suitable volatile or non-volatile memory configured to store digital images from photosensor array 106. Memory 112 operates to receive images from photosensor array 106 and provide images to controller 102 and/or interface 114 in response to control signals from controller 102.

Interface 114 may be any suitable wired or wireless interface configured to receive commands from an input/output device and/or an external device and provide digital images captured using photosensor array 106 to an input/output device and/or an external device.

In operation, controller 102 receives a command across interface 114 to capture an image from medium 120. Controller 102 may also receive parameters associated with the command that indicate a resolution mode or other mode of operation with which to capture the image. In response to receiving the command, scan module 118 in controller 102 causes control signals to be provided to drive mechanism 104, photosensor array 106, illumination source 108, and memory 112 to cause the image to be captured from medium 120. Scan module 118 may also initiate calibration module 118 to cause a calibration of photosensor array 106 to be performed as described in additional detail below.

Responsive to control signals from controller 102, drive mechanism 104 moves medium 120 relative to photosensor array 106 to expose regions of medium 120 to photosensor array 106 during an exposure period. During the exposure period, light from illumination source 108 is reflected off of or transmitted through medium 120 and at least a portion of background 110, as indicated by an arrow 122, and onto photosensor array 106, as indicated by an arrow 124. Individual pixels in photosensor array 106 capture photons to allow raw pixel values associated with the captured photons to be read out of photosensor array 106 and stored in memory 112. Scan module 118 processes or converts the raw pixel values into pixel values that comprise a digital image of medium 120 and stores the digital image in memory 112. Scan module 118 may also cause the digital image to be provided across interface 114 to an input /output device or an external device.

Controller 102 is also configured to calibrate photosensor array 106 using calibration module 116. During a calibration operation, medium 120 is not present to allow photosensor array 106 to receive light solely from background surface 110. To calibrate photosensor array 106, calibration module 116 causes illumination source 108 to be activated to direct light from illumination source 108 onto or through background surface 110, as indicated by arrow 122, and onto photosensor array 106, as indicated by arrow 124. Individual pixels in photosensor array 106 capture photons to allow raw pixel values associated with the captured photons to be read out of photosensor array 106 and stored in memory 112. Controller 102 processes or converts the raw pixel values into pixel values that comprise one or more digital images of background surface 110.

Controller 102 compares the digital images to a known color of background surface 110 represented by calibration information 119. Calibration information 119 may represent the known color using a previously scanned image of background surface 110 (e.g., an image captured during the manufacture of image capture device 100) or another suitable representation of the known color that allows for a comparison with the digital images. Controller 102 adjusts photosensor array 106 based on the comparison between the digital images and the known color. For example, controller 102 may detect any photo response non-uniformity (PSNU) in one or more pixels in photosensor array 106 in the comparison and adjust the gain of one or more pixels in photosensor array 106 to compensate for the PSNU. In addition, controller 102 may detect any dark signal non-uniformity (DSNU) in one or more pixels in photosensor array 106 in the comparison and adjust the offset of one or more pixels in photosensor array 106 to compensate for the DSNU. In addition, controller 102 may process the digital images to perform defect recognition and correction for one or more pixels in photosensor array 106 using any suitable algorithm.

Figure 2:
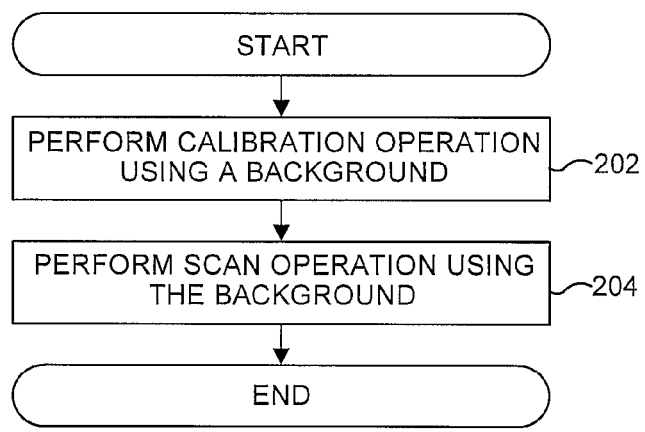
FIG. 2 is a flow chart illustrating one embodiment of a method for operating an image capture device.

Image capture device 100 uses the same background surface 110 to perform a scan operation and a calibration operation. FIG. 2 is a flow chart illustrating one embodiment of a method for operating image capture device 100.

Figure 3A:
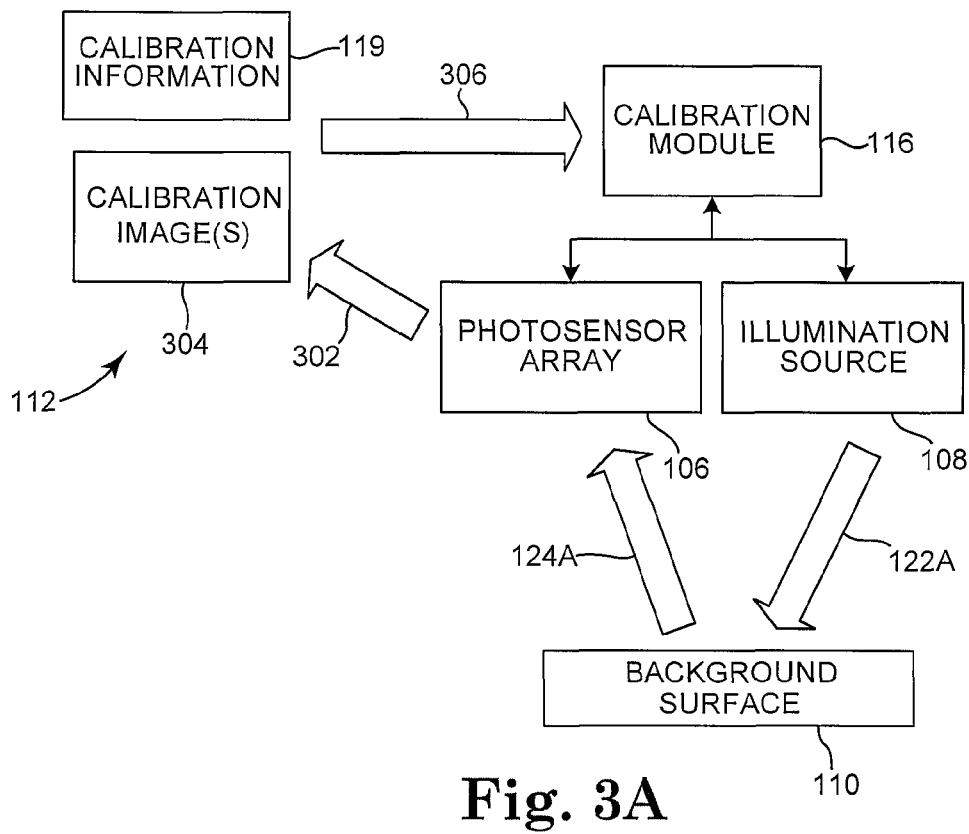
FIGS. 3A and 3B are block diagrams illustrating embodiments of the operation of an image capture device.

In FIG. 2, image capture device 100 performs a calibration operation on photosensor array 106 using background surface 110 as indicated in a block 202. One embodiment of calibration operation is shown in FIG. 3A. As shown in FIG. 3A, calibration module 116 causes illumination source 108 to be activated to provide light to background surface 110 as indicated by an arrow 122A. Photosensor array 106 detects light from background surface 110 as indicated by an arrow 124A and stores one or more calibration images 304 in memory 112 as indicated by an arrow 302. Calibration images 304 include one or more images of background surface 110. Calibration module 116 compares calibration images 304 to the known color of background surface 110 using calibration information 119, as indicated by an arrow 306, and adjusts photosensor array 106 to complete the calibration operation as described in additional detail above.

Figure 3B:
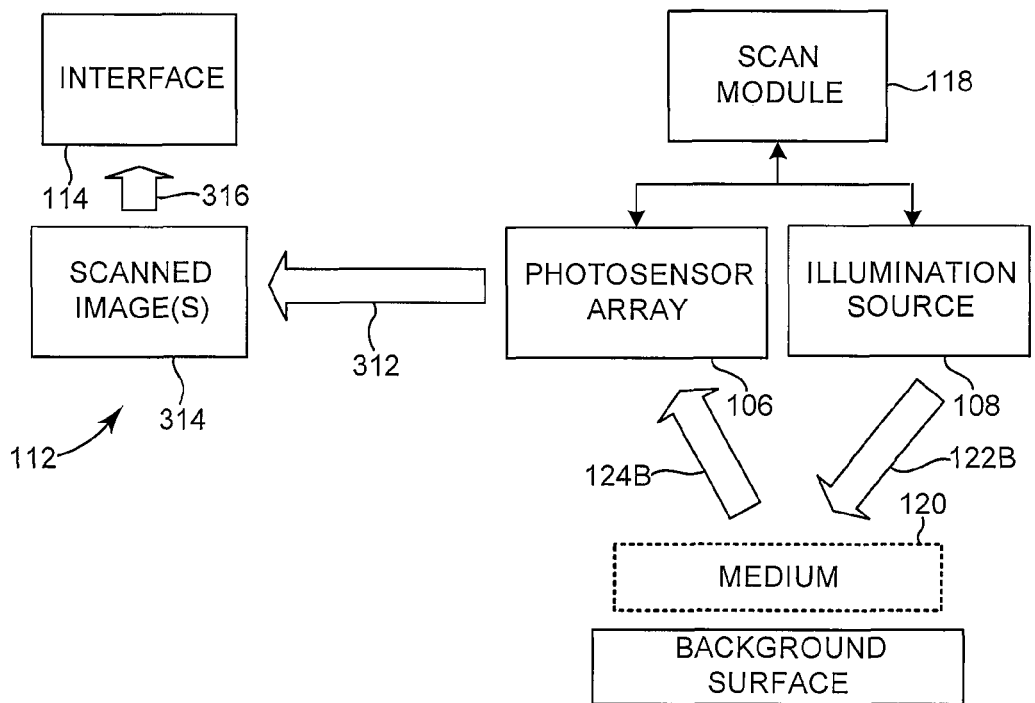

Image capture device 100 performs a scan operation with photosensor array 106 using background surface 110 as indicated in a block 204. One embodiment of scan operation is shown in FIG. 3B. As shown in FIG. 3B, scan module 118 causes illumination source 108 to be activated to provide light to background surface 110 and medium 120 as indicated by an arrow 122B. Photosensor array 106 detects light from at least a portion of background surface 110 and medium 120 as indicated by an arrow 124B and stores one or more scanned images 314 in memory 112 as indicated by an arrow 312. Scanned images 314 include one or more images of the combination of background surface 110 and medium 120. Scan module 118 processes scanned images 314 and causes scanned images 314 to be provided across interface 114 as indicated by an arrow 316 to complete the scan operation as described in additional detail above.

In one embodiment, the calibration operation of block 202 may be performed prior to the scan operation of block 204 each time that a scan operation is performed. In other embodiments, the calibration operation of block 202 may be periodically omitted prior to the scan operation of block 204 (i.e., a scan operation may rely on a previously performed calibration operation). In further embodiments, the calibration operation of block 202 may be performed independently of a scan operation of block 204. In each embodiment, however, background surface 110 is used for both calibration operations and scan operations regardless of when they are performed.

Controller 102, calibration module 116, and scan module 118 may comprise any suitable combination of hardware and software components configured to perform the functions described herein. For example, controller 102 calibration module 116, and scan module 118 may form a program product with instructions (not shown) that are executed by a processor (not shown) where the program product is stored in any suitable portable or non-portable storage medium accessible by the processor. The program product may be stored externally to image capture device 100 prior to being stored internally to image capture device 100 and may be accessed by image capture device 100 from a remote device (not shown).

In other embodiments, image capture device 100 may include or otherwise form a facsimile device, a digital camera, or other functional units configured to perform image capture, or processing functions.

A facsimile device may be configured to send and receive digital images using a network connection, e.g., a telephone line or an Internet connection (not shown). The facsimile device may acquires a digital image from medium 120 using photosensor array 106 as described above and send the electronic image to another facsimile or other device using the network connection. In response to receiving a digital image from the network connection, the facsimile device may cause a printer to print the digital image onto a medium (not shown).

Although specific embodiments have been illustrated and described herein for purposes of description of the embodiments, it will be appreciated by those of ordinary skill in the art that a wide variety of alternate and/or equivalent implementations may be substituted for the specific embodiments shown and described without departing from the scope of the present disclosure. Those with skill in the art will readily appreciate that the present disclosure may be implemented in a very wide variety of embodiments. This application is intended to cover any adaptations or variations of the disclosed embodiments discussed herein. Therefore, it is manifestly intended that the scope of the present disclosure be limited only by the claims and the equivalents thereof.

What is claimed is:

1. A method performed by an image capture device, the method comprising:
   comparing a calibration image of at least a portion of a background surface having a substantially uniform grey color that is approximately 50% grey to a previous image of the portion of the background surface, the calibration image and the previous image captured by a photosensor array of the image capture device;
   compensating for at least one of a photo response non-uniformity or a dark signal non-uniformity of one or more pixels of the photosensor array based on comparing the calibration image to the previous image; and
   subsequent to the compensating, capturing a scanned image of a medium and the portion of the background surface using light received by the photosensor array from the medium and the portion of the background surface.

2. The method of claim 1 wherein the substantially uniform grey color is light enough to detect differences between the calibration image and the previous image and is dark enough to allow one or more edges of the medium in the scanned image to be detected.

3. The method of claim 1 further comprising:
   identifying an edge of the medium in the scanned image using the background surface.

4. The method of claim 1 further comprising:
   illuminating the portion of the background surface while capturing the calibration image; and
   illuminating the portion of the background surface and the medium while capturing the scanned image.

5. The method of claim 1 further comprising:
   moving the medium relative to the photosensor array while capturing the scanned image.

6. The method of claim 1 further comprising:
   capturing the scanned image in response to receiving a scan command.

7. The method of claim 1 further comprising:
   providing the scanned image to an interface.

8. The method of claim 1 wherein the previous image is captured by the photosensor array during the manufacture of the image capture device.

9. An image capture device comprising:
   a controller;
   a photosensor array; and
   a background surface with at least a portion having a substantially uniform grey color that is approximately 50% grey;
   wherein the controller is configured to adjust at least one of a gain or an offset of one or more pixels of the photosensor array in response to comparing a calibration image of the portion of the background surface captured by the photosensor array to a previous image of the portion of the background surface captured by the photosensor array, and wherein the controller is configured to cause a scanned image to be captured of a medium and the portion of the background surface using light received by the photosensor array from the medium and the portion of the background surface.

10. The image capture device of claim 9 wherein the controller is configured to adjust the photosensor array to correct a photo response non-uniformity of the photosensor array.

11. The image capture device of claim 9 wherein the controller is configured to adjust the photosensor array to correct a dark signal non-uniformity of the photosensor array.

12. The image capture device of claim 9 wherein the substantially uniform grey color is light enough to allow the controller to detect differences between the calibration image and the previous image and is dark enough to allow the controller to detect one or more edges of the medium in the scanned image.

13. The image capture device of claim 9 further comprising:
   a drive mechanism configured to feed the medium between the photosensor array and the background surface.

14. The image capture device of claim 9 further comprising:
   an illumination source configured to illuminate the portion of the background surface while the calibration image is captured and configured to illuminate the medium and the portion of the background surface while the scanned image is captured.

15. A program product comprising a non-transitory storage medium including instructions executable by a processor for:
   comparing a calibration image captured by a photosensor array to include a portion of a background surface to calibration information that identifies a known color of the background surface, the portion having a substantially uniform grey color that is approximately 50% grey; and
   processing a scanned image captured by the photosensor array to include an imaging medium and the portion of the background surface having the substantially uniform grey color to identify an edge of the imaging medium.

16. The program product of claim 15 wherein the substantially uniform grey color is light enough detect differences between the calibration image and the known color and is dark enough to detect the edges of the imaging medium in the scanned image.

17. The program product of claim 15 wherein the substantially uniform grey color is light enough to allow the photosensor array to be calibrated and is dark enough to allow the edge of the imaging medium to be detected.

18. The program product of claim 15 wherein the calibration information is a previous image of the portion of the background surface captured by the photosensor array.

* * * * *